United States Patent
Sakata

(10) Patent No.: US 9,456,379 B2
(45) Date of Patent: Sep. 27, 2016

(54) VEHICLE-MOUNTED DEVICE AND CONGESTION CONTROL METHOD

(71) Applicant: NEC CORPORATION, Tokyo (JP)

(72) Inventor: Masayuki Sakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 114 days.

(21) Appl. No.: 14/378,099

(22) PCT Filed: Dec. 18, 2012

(86) PCT No.: PCT/JP2012/082719
§ 371 (c)(1),
(2) Date: Aug. 12, 2014

(87) PCT Pub. No.: WO2013/125140
PCT Pub. Date: Aug. 29, 2013

(65) Prior Publication Data
US 2015/0036487 A1 Feb. 5, 2015

(30) Foreign Application Priority Data
Feb. 20, 2012 (JP) .................................. 2012-033836

(51) Int. Cl.
*H04W 28/02* (2009.01)
*H04L 29/08* (2006.01)

(52) U.S. Cl.
CPC ..... *H04W 28/0289* (2013.01); *H04W 28/0284* (2013.01); *H04L 67/12* (2013.01)

(58) Field of Classification Search
CPC .............. G08C 17/02; H04W 52/343; H04L 2012/40273; H04L 47/12; H04L 47/14; H04L 67/18; G08G 1/096716; G08G 1/09675; G08G 1/096791; G08G 1/162; G08G 1/163; H02J 13/0062; H02J 13/0075; H02J 13/0079
See application file for complete search history.

(56) References Cited

U.S. PATENT DOCUMENTS 7,447,576 B2 * 11/2008 Ban et al. ........................ 701/36
7,953,009 B2 * 5/2011 Adachi et al. ................ 370/235
(Continued)

FOREIGN PATENT DOCUMENTS

| JP | 2005-039665 | 2/2005 |
|----|-------------|--------|
| JP | 2011-015047 | 1/2011 |

(Continued)

OTHER PUBLICATIONS

International Search Report—PCT/JP2012/082719—Mar. 5, 2013.
(Continued)

*Primary Examiner* — Ayaz Sheikh
*Assistant Examiner* — Debebe Asefa
(74) *Attorney, Agent, or Firm* — Young & Thompson

(57) ABSTRACT

A vehicle-mounted device includes a measurement unit that detects the radio signal to measure a congestion level, a reception unit that receives, from each of the predetermined vehicle-mounted devices, the value of a predetermined parameter, in which a degree of contribution to congestion increases as the value of the parameter increases, from among parameters relating to the communication of the predetermined vehicle-mounted device, and a control unit that sets, when the congestion level measured by the measurement unit is outside a set predetermined range, the value of the predetermined parameter of its own device so that the congestion level is within the predetermined range in consideration of the magnitude relationship between the congestion level and a value within the predetermined range and a magnitude relationship between the value of the predetermined parameter received by the reception unit and the value of the predetermined parameter of its own device.

21 Claims, 6 Drawing Sheets

(56) References Cited

U.S. PATENT DOCUMENTS 8,229,668 B2 * 7/2012 Kawauchi et al. ........... 701/432
8,593,300 B2 * 11/2013 Ooshima et al. ............ 340/901

FOREIGN PATENT DOCUMENTS

| JP | 2011-030035 | 2/2011 |
| JP | 2012-070324 | 4/2012 |
| JP | 2012-080192 | 4/2012 |
| WO | 2008/099716 | 8/2008 |
| WO | 2009/107297 | 9/2009 |
| WO | 2011/038881 | 4/2011 |

OTHER PUBLICATIONS

Extended European Search Report dated Sep. 24, 2015 in corresponding European Patent Application No. 12869532.7.
Chonlatee Khorakhun et al., "Congestion Control for VANETs based on Power or Rate Adaptation", Proceedings of the 5th International Workshop on Intelligent Transportation (WIT 2008), Hamburg, Germany, Mar. 18-19, 2008, pp. 99-104, XP009186029.
Miguel Sepulcre et al., "Congestion and Awareness Control in Cooperative Vehicular Systems", Proceedings of the IEEE, IEEE, New York, US, vol. 99, No. 7, Jul. 2011, pp. 1260-1279, XP011367584.

* cited by examiner

| PARAMETER | ① | AVERAGE | ② | ③ | ④ | ⑤ | ⑥ | ⑦ | ⑧ | ⑨ | ⑩ |
|---|---|---|---|---|---|---|---|---|---|---|---|
| CHANNEL LOAD(%) | 50 | 50 | 50 | 50 | 50 | 50 | 50 | 50 | 50 | 50 | 50 |
| TRANSMISSION POWER (dBm) | 20 | 20 | 20 | 20 | 20 | 20 | 20 | 20 | 20 | 20 | 20 |
| RECEPTION SENSITIVITY (dBm) | -95 | -95 | -95 | -95 | -95 | -95 | -95 | -95 | -95 | -95 | -95 |
| TRANSMISSION COMMUNICATION RATE (Mbps) | 6 | 6 | 6 | 6 | 6 | 6 | 6 | 6 | 6 | 6 | 6 |
| TRANSMISSION INTERVAL (ms) | 100 | 100 | 100 | 100 | 100 | 100 | 100 | 100 | 100 | 100 | 100 |

S202   SET VALUE LOWER THAN OR EQUAL TO AVERAGE (TRANSMISSION POWER)

| PARAMETER | ① | AVERAGE | ② | ③ | ④ | ⑤ | ⑥ | ⑦ | ⑧ | ⑨ |
|---|---|---|---|---|---|---|---|---|---|---|
| CHANNEL LOAD(%) | 45 | 45 | 45 | 45 | 45 | 45 | 45 | 45 | 45 | 45 |
| TRANSMISSION POWER (dBm) | 17 | 17 | 17 | 17 | 17 | 17 | 17 | 17 | 17 | 17 |
| RECEPTION SENSITIVITY (dBm) | -95 | -95 | -95 | -95 | -95 | -95 | -95 | -95 | -95 | -95 |
| TRANSMISSION COMMUNICATION RATE (Mbps) | 6 | 6 | 6 | 6 | 6 | 6 | 6 | 6 | 6 | 6 |
| TRANSMISSION INTERVAL (ms) | 100 | 100 | 100 | 100 | 100 | 100 | 100 | 100 | 100 | 100 |

S203   SET VALUE LOWER THAN OR EQUAL TO AVERAGE (RECEPTION SENSITIVITY)

| PARAMETER | ① | AVERAGE | ② | ③ | ④ | ⑤ | ⑥ | ⑦ | ⑧ |
|---|---|---|---|---|---|---|---|---|---|
| CHANNEL LOAD(%) | 39 | 39 | 39 | 39 | 39 | 39 | 39 | 39 | 39 |
| TRANSMISSION POWER (dBm) | 17 | 17 | 17 | 17 | 17 | 17 | 17 | 17 | 17 |
| RECEPTION SENSITIVITY (dBm) | -90 | -90 | -90 | -90 | -90 | -90 | -90 | -90 | -90 |
| TRANSMISSION COMMUNICATION RATE (Mbps) | 6 | 6 | 6 | 6 | 6 | 6 | 6 | 6 | 6 |
| TRANSMISSION INTERVAL (ms) | 100 | 100 | 100 | 100 | 100 | 100 | 100 | 100 | 100 |

S204   MAINTAIN SET VALUE

| PARAMETER | ① | AVERAGE | ② | ③ | ④ | ⑤ |
|---|---|---|---|---|---|---|
| CHANNEL LOAD(%) | 19 | 19 | 19 | 19 | 19 | 19 |
| TRANSMISSION POWER (dBm) | 17 | 17 | 17 | 17 | 17 | 17 |
| RECEPTION SENSITIVITY (dBm) | -90 | -90 | -90 | -90 | -90 | -90 |
| TRANSMISSION COMMUNICATION RATE (Mbps) | 6 | 6 | 6 | 6 | 6 | 6 |
| TRANSMISSION INTERVAL (ms) | 100 | 100 | 100 | 100 | 100 | 100 |

 SET VALUE HIGHER THAN OR EQUAL TO AVERAGE (RECEPTION SENSITIVITY)

| PARAMETER | ① | AVERAGE | ② | ③ | ④ | ⑤ | ⑪ | ⑫ | | | |
|---|---|---|---|---|---|---|---|---|---|---|---|
| CHANNEL LOAD(%) | 30 | 30 | 30 | 30 | 30 | 30 | 30 | 30 | | | |
| TRANSMISSION POWER (dBm) | 17 | 17 | 17 | 17 | 17 | 17 | 20 | 20 | | | |
| RECEPTION SENSITIVITY (dBm) | -95 | -95 | -95 | -95 | -95 | -95 | -95 | -95 | | | |
| TRANSMISSION COMMUNICATION RATE (Mbps) | 6 | 6 | 6 | 6 | 6 | 6 | 6 | 6 | | | |
| TRANSMISSION INTERVAL (ms) | 100 | 100 | 100 | 100 | 100 | 100 | 100 | 100 | | | |

⬇ MAINTAIN SET VALUE

S206

| PARAMETER | ① | AVERAGE | ② | ③ | ④ | | | | | | |
|---|---|---|---|---|---|---|---|---|---|---|---|
| CHANNEL LOAD(%) | 19 | 19 | 19 | 19 | 19 | | | | | | |
| TRANSMISSION POWER (dBm) | 17 | 17 | 17 | 17 | 17 | | | | | | |
| RECEPTION SENSITIVITY (dBm) | -95 | -95 | -95 | -95 | -95 | | | | | | |
| TRANSMISSION COMMUNICATION RATE (Mbps) | 6 | 6 | 6 | 6 | 6 | | | | | | |
| TRANSMISSION INTERVAL (ms) | 100 | 100 | 100 | 100 | 100 | | | | | | |

⬇ SET VALUE HIGHER THAN OR EQUAL TO AVERAGE (TRANSMISSION POWER)

S207

| PARAMETER | ① | | ② | ③ | | | | | | | |
|---|---|---|---|---|---|---|---|---|---|---|---|
| CHANNEL LOAD(%) | 14 | 14 | 14 | 14 | | | | | | | |
| TRANSMISSION POWER (dBm) | 20 | 20 | 20 | 20 | | | | | | | |
| RECEPTION SENSITIVITY (dBm) | -95 | -95 | -95 | -95 | | | | | | | |
| TRANSMISSION COMMUNICATION RATE (Mbps) | 6 | 6 | 6 | 6 | | | | | | | |
| TRANSMISSION INTERVAL (ms) | 100 | 100 | 100 | 100 | | | | | | | |

VEHICLE-MOUNTED DEVICE AND CONGESTION CONTROL METHOD

TECHNICAL FIELD

The present invention relates to a vehicle-mounted device and a congestion control method.

BACKGROUND ART

In ITS (intelligent Transport Systems), inter-vehicle communication is carried out to transfer information between cars by using a radio wave. In the inter-vehicle communication that is carried out by using the radio wave in a predetermined band, when the number of cars that are engaged in inter-vehicle communication in a given region increases, the congestion of radio waves may occur to disable communication between the cars.

In communication between mobile phones carried out via a base station, generally, control is performed at the base station to prevent congestion. However, in the inter-vehicle communication, no base station is present to perform control for preventing congestion. Thus, when the number of cars, which are engaged in inter-vehicle communication in a given region, increases, the cars preferably perform control to prevent congestion.

Patent Literature 1 describes a vehicle communication apparatus that performs control to prevent congestion.

The vehicle communication apparatus described in Patent Literature 1 estimates a congestion state level indicating whether congestion will soon occur based on the channel utilization rate. The channel utilization rate indicates the busy rate of a channel engaged in transmission/reception.

In the vehicle communication apparatus described in Patent Literature 1, when the congestion state level is equal to or higher than a predetermined level, the transmission power of its own vehicle is set lower than that of its own vehicle when the congestion state level is lower than the predetermined level.

Thus, the vehicle communication apparatus described in Patent Literature 1 can prevent congestion by setting the transmission power low among communication parameters for its own vehicle.

CITATION LIST

Patent Literature

Patent Literature 1: WO 2008/099716 A1

SUMMARY OF INVENTION

Problems to be Solved

In the vehicle communication apparatus described in Patent Literature 1, when the congestion state level is equal to or higher than the predetermined level, the transmission power of its own vehicle is set lower than that of its own vehicle when the congestion state level is lower than the predetermined level.

Accordingly, in the vehicle communication apparatus, in a status where a radio wave has been transmitted from a neighboring vehicle having transmission power higher than that of its own vehicle, the transmission power of its own vehicle is set low when the congestion state level is equal to or higher than the predetermined level. As a result, the transmission power of its own vehicle may be extremely low compared with that of the neighboring vehicle, thus increasing variation in transmission power of the vehicles.

There is therefore a problem, namely, a larger difference in communication parameters among a plurality of vehicles caused by congestion prevention.

It is an object of the present invention to provide a vehicle-mounted device and a congestion control method capable of performing congestion control according to the congestion status of communication while reducing differences in communication parameters among a plurality of vehicles.

Solution to Problems

A vehicle-mounted device according to the present invention, which communicates with a predetermined vehicle-mounted device mounted on each of a plurality of vehicles by a radio signal, includes:

measurement means that detects the radio signal to measure a congestion level;

reception means that receives, from each of the predetermined vehicle-mounted devices, a value of a predetermined parameter, in which the degree of contribution to congestion increases as the value of the parameter increases, from among parameters relating to the communication of the predetermined vehicle-mounted device; and control means that sets, when the congestion level measured by the measurement means is outside a set predetermined range, the value of the predetermined parameter of its own device so that the congestion level is within the predetermined range in consideration of a magnitude relationship between the congestion level and a value within the predetermined range and a magnitude relationship between the value of the predetermined parameter received by the reception means and the value of the predetermined parameter of its own device.

A vehicle-mounted device according to the present invention, which communicates with a predetermined vehicle-mounted device mounted on each of a plurality of vehicles by a radio signal, includes:

measurement means that detects the radio signal to measure a congestion level;

reception means that receives, from each of the predetermined vehicle-mounted devices, a value of a specific parameter, in which the degree of contribution to congestion decreases as the value of the parameter increases, from among parameters relating to the communication of the predetermined vehicle-mounted device; and control means that sets, when the congestion level measured by the measurement means is outside a set predetermined range, the value of the specific parameter of its own device so that the congestion level is within the predetermined range in consideration of a magnitude relationship between the congestion level and a value within the predetermined range and a magnitude relationship between the value of the specific parameter received by the reception means and the value of the specific parameter of its own device.

A vehicle-mounted device according to the present invention, which communicates with a predetermined vehicle-mounted device mounted on each of a plurality of vehicles by a radio signal, includes:

measurement means that detects the radio signal to measure a congestion level;

reception means that receives, from each of the predetermined vehicle-mounted devices, a value of a predetermined parameter, in which the degree of contribution to congestion increases as the value of the parameter increases, and a value of a specific parameter, in which the degree of contribution to congestion decreases as the value of the parameter increases, from among parameters relating to the communication of the predetermined vehicle-mounted device; and control means that sets, when the congestion level measured by the measurement means is outside a set predetermined range, the value of the predetermined parameter and/or the value of the specific parameter of its own device so that the congestion level is within the predetermined range in consideration of a magnitude relationship between the congestion level and a value within the predetermined range, a magnitude relationship between the value of the predetermined parameter received by the reception means and the value of the predetermined parameter of its own device, and a magnitude relationship between the value of the specific parameter received by the reception means and the value of the specific parameter of its own device.

A congestion control method of a vehicle-mounted device according to the present invention, which communicates with a predetermined vehicle-mounted device mounted on each of a plurality of vehicles by a radio signal, includes:

detecting the radio signal to measure a congestion level;

receiving, from each of the predetermined vehicle-mounted devices, a value of a predetermined parameter, in which the degree of contribution to congestion increases as the value of the parameter increases, from among parameters relating to the communication of the predetermined vehicle-mounted device; and setting, when the measured congestion level is outside a set predetermined range, the value of the predetermined parameter of its own device so that the congestion level is within the predetermined range in consideration of a magnitude relationship between the congestion level and a value within the predetermined range and a magnitude relationship between the received value of the predetermined parameter and the value of the predetermined parameter of its own device.

A congestion control method of a vehicle-mounted device according to the present invention, which communicates with a predetermined vehicle-mounted device mounted on each of a plurality of vehicles by a radio signal, includes:

detecting the radio signal to measure a congestion level;

receiving, from each of the predetermined vehicle-mounted devices, a value of a specific parameter, in which the degree of contribution to congestion increases as the value of the parameter decreases, from among parameters relating to the communication of the predetermined vehicle-mounted device; and setting, when the measured congestion level is outside a set predetermined range, the value of the specific parameter of its own device so that the congestion level is within the predetermined range in consideration of a magnitude relationship between the congestion level and a value within the predetermined range and a magnitude relationship between the received value of the specific parameter and the value of the specific parameter of its own device.

A congestion control method of a vehicle-mounted device according to the present invention, which communicates with a predetermined vehicle-mounted device mounted on each of a plurality of vehicles by a radio signal, includes:

detecting the radio signal to measure a congestion level;

receiving, from each of the predetermined vehicle-mounted devices, a value of a predetermined parameter, in which the degree of contribution to congestion increases as the value of the parameter increases, and a value of a specific parameter, in which the degree of contribution to congestion decreases as the value of the parameter increases, from among parameters relating to the communication of the predetermined vehicle-mounted device; and setting, when the measured congestion level is outside a set predetermined range, the value of the predetermined parameter and/or the value of the specific parameter of its own device so that the congestion level is within the predetermined range in consideration of a magnitude relationship between the congestion level and a value within the predetermined range, a magnitude relationship between the received value of the predetermined parameter and the value of the predetermined parameter of its own device, and a magnitude relationship between the received value of the specific parameter and the value of the specific parameter of its own device.

Effects of Invention

The present invention provides the vehicle-mounted device and the congestion control method capable of performing congestion control according to the congestion status of communication while reducing a difference in communication parameter among the plurality of vehicles. A channel load can be prevented from suddenly increasing or decreasing when the congestion control is performed or canceled in the inter-vehicle communication.

BRIEF DESCRIPTION OF DRAWINGS

FIG. 3 A table illustrating the example of a communication parameter used for congestion control.

FIG. 4 A table illustrating the example of a communication parameter used for congestion control (sequel from FIG. 3).

DESCRIPTION OF EMBODIMENTS

Hereinafter, an exemplary embodiment of the present invention will be described with reference to the accompanying drawings.

Figure 1:
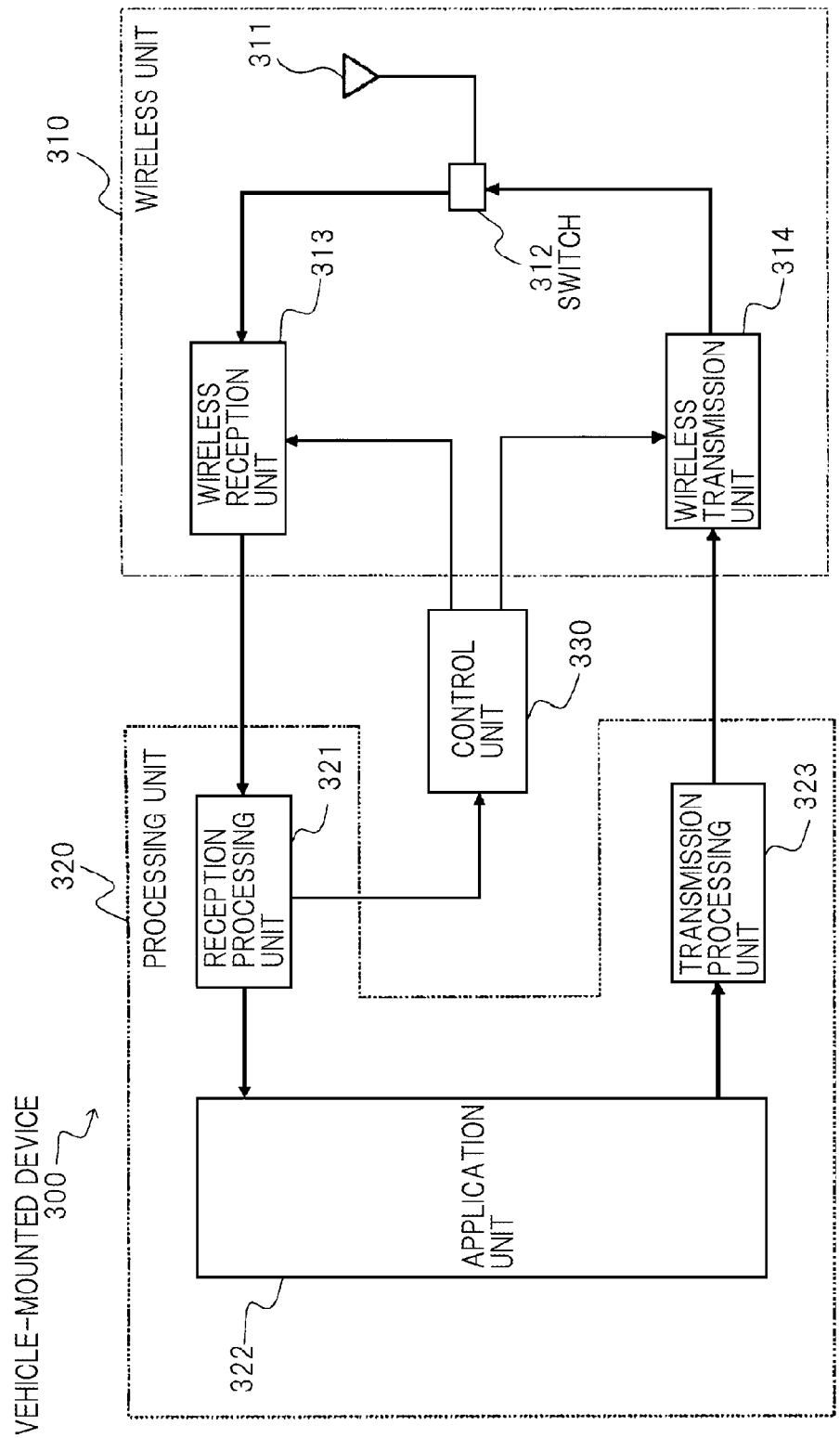
FIG. 1 A block diagram illustrating the configuration example of a vehicle-mounted device according to the embodiment of the present invention.

FIG. 1 is a block diagram illustrating a configuration example of a vehicle-mounted device according to the exemplary embodiment of the present invention.

Vehicle-mounted device 300 is a device that is mounted on a vehicle. Vehicle-mounted device 300 communicates with the other vehicle-mounted device that is mounted on each of a plurality of vehicles by a radio signal. The other vehicle-mounted device that is mounted on each of the plurality of vehicles can be generally referred to as a predetermined vehicle-mounted device. The other vehicle-mounted device has the same function as that of vehicle-mounted device 300.

Vehicle-mounted device 300 includes wireless unit 310, processing unit 320, and control unit 330. Wireless unit 310 includes antenna 311, switch 312, wireless reception unit 313, and wireless transmission unit 314. Processing unit 320 includes reception processing unit 321, application unit 322, and transmission processing unit 323.

Wireless unit 310 can be generally referred to as measurement means.

Wireless unit 310 detects a radio signal that is used for communication with the other vehicle-mounted device to measure a congestion level. The radio signal that is used for communication with the other vehicle-mounted device will be simply referred to as a "radio signal" hereinafter. The congestion level is referred to as a channel load factor in the exemplary embodiment.

Antenna 311 is used to transmit or receive a packet by radio signal.

Switch 312 connects antenna 311 to wireless reception unit 313 or wireless transmission unit 314. Switch 312 connects wireless transmission unit 314 to antenna 311 for only an output period where wireless transmission unit 314 outputs the packet. Switch 312 connects wireless reception unit 313 to antenna 311 during a period other than the output period.

Wireless reception unit 313 receives the radio signal via antenna 311. Upon receiving the radio signal, wireless reception unit 313 obtains the packet that is indicated by the radio signal.

Wireless reception unit 313 detects radio signals transmitted from vehicle-mounted vehicle 300 and the other vehicle-mounted vehicle. Upon detecting the radio signals, wireless reception unit 313 measures a channel load factor that indicates the ratio of a detection period of detecting radio signals within a predetermined period. Wireless reception unit 313 supplies the obtained packet and the measured channel load factor to reception processing unit 321.

Processing unit 320 can be generally referred to as reception means.

Processing unit 320 receives, from the other vehicle-mounted device, the value (dBm) of transmission power among parameters relating to the communication of the other vehicle-mounted device. The transmission power is a parameter, in which the degree of contribution to congestion increases as the value of the parameter increases. The transmission power can be generally referred to as a predetermined parameter.

Processing unit 320 receives, from each of the other vehicle-mounted devices, a channel load factor measured by the other vehicle-mounted device.

Processing unit 320 receives, from each of the other vehicle-mounted devices, the values of reception sensitivity (dBm), a transmission communication rate (Mbps: Mega bit per second), and a transmission interval (ms: millisecond) from among the parameters relating to the communication of the other vehicle-mounted device. Each of the parameters from among reception sensitivity, transmission communication rate and transmission interval is a parameter in which the degree of contribution to congestion decreases as the value of the parameter increases. Each of the reception sensitivity, the transmission communication rate, and the transmission interval can be generally referred to as a specific parameter.

Thus, processing unit 320 receives, from each of the other vehicle-mounted devices, the values of the transmission power, the reception sensitivity, the transmission communication rate, and the transmission interval of the other vehicle-mounted device, and the channel load factor measured by the other vehicle-mounted vehicle.

In the exemplary embodiment, reception processing unit 321 extracts, for each reception of a packet from wireless reception unit 313, a device identifier for identifying the other vehicle-mounted device, congestion information that indicates the channel load factor, and parameter information that indicates the value of the transmission power, the value of the reception sensitivity, the value of the transmission communication rate, and the value of the transmission interval from among the pieces of information contained in the packet.

Upon extracting the congestion information and the parameter information for each device identifier, reception processing unit 321 supplies the device identifier, the congestion information, and the parameter information to control unit 330. Reception processing unit 321 supplies information contained in a packet other than the device identifier, the congestion information, and the parameter information, for example, vehicle information that indicates the position or a type of the vehicle of the other vehicle-mounted device, to application unit 322. Upon receiving the channel load factor measured by wireless reception unit 313, reception processing unit 321 supplies the channel load factor to control unit 330.

Control unit 330 can be generally referred to as control means.

In the exemplary embodiment, control unit 330 receives, from reception processing unit 321, the channel load factor measured by wireless reception unit 313, and the parameter information and the congestion information of each of the other vehicle-mounted device.

Upon receiving the channel load factor measured by wireless reception unit 313 and the congestion information of each of the other vehicle-mounted devices, control unit 330 calculates an average value among the channel load factors indicated by the respective pieces of congestion information, and determines which of the average value among the channel load factors of the other vehicle-mounted devices and the channel load factor measured by wireless reception unit 313 exceeds a determination threshold value.

Control unit 330 determines whether or not the channel load factor measured by wireless unit 310 exceeds the determination threshold value. The determination threshold value is a threshold value for determining whether or not the possibility of congestion in the communicable region of vehicle-mounted vehicle 300 is high. The determination threshold value can be generally referred to as a predetermined threshold value.

Control unit 330 performs congestion control when one of the channel load factor measured by wireless reception unit 313 and the average value among the channel load factors of the other vehicle-mounted devices exceeds the predetermined threshold value.

The congestion control is performed by comparing the parameter of vehicle-mounted device 300 with a parameter indicated by each piece of parameter information for each of the parameters of transmission power, reception sensitivity, a transmission communication rate, and a transmission interval, and by setting each value by control unit 330 according to the status of the channel load factor.

When neither the channel load factors measured by wireless reception unit 313 nor the average value among the channel load factors of the other vehicle-mounted devices exceeds the determination threshold value, control unit 330 does not change the value of any of the parameters that include transmission power, reception sensitivity, transmission communication rate and transmission interval.

Control unit 330 supplies its own vehicle congestion information that indicates the channel load factor measured by wireless reception unit 313, and its own vehicle parameter information that indicates the values of the transmission power, the reception sensitivity, the transmission communication rate and the transmission interval of vehicle-mounted device 300 to wireless transmission unit 314.

Application unit 322 receives information other than the congestion information and the parameter information contained in the packet (e.g., vehicle information). Application unit 322 executes predetermined processing after it has received, for example, the vehicle information. Application unit 322 executes the predetermined processing to generate transmission information. Upon generating the transmission information, application unit 322 supplies the transmission information to transmission processing unit 323.

Upon receiving the transmission information from application unit 322, transmission processing unit 323 converts the transmission information into a packet. Wireless processing unit 323 supplies the packet, which is converted, to wireless transmission unit 314.

Wireless transmission unit 314 transmits its own vehicle congestion information and its own vehicle parameter information to the other vehicle-mounted device.

In the exemplary embodiment, upon receiving its own vehicle congestion information and its own vehicle parameter information from control unit 330, wireless transmission unit 314 stores a device identifier for identifying vehicle-mounted device 314, its own vehicle congestion information, and its own vehicle parameter information in the header part of the packet, and transmits the packet, in which the device identifier, its own vehicle congestion information, and its own vehicle parameter information have been stored, via antenna 311.

For example, upon receiving the packet from transmission processing unit 323, wireless transmission unit 314 outputs the packet, in which the device identifier, its own vehicle congestion information, and its own vehicle parameter information have been stored, by the transmission power of a value indicated by the transmission power information received from control unit 330.

The triggering of congestion control and cancellation will be described referring to FIG. 2.

At the time of starting the congestion control, control unit 330 performs control to set the value of the transmission power of vehicle-mounted device 300 so that the value of the transmission power (predetermined parameter) of vehicle-mounted device 300, which contributes to congestion, can be smaller than the average value of the transmission power (predetermined parameter) of the other vehicle-mounted vehicles. At the time of cancelling the congestion control, control unit 330 sets the value of the transmission power of vehicle-mounted device 300 so that the value of the transmission power of vehicle-mounted device 300, which contributes to congestion, can be larger than the average value of the transmission power of the other vehicle-mounted vehicles. At the time when the channel load factor returns to the setting value of the initial value, control to change the value of the transmission power of vehicle-mounted device 300 is not performed.

The congestion control performed at control unit 330 according to the channel load factor will be described referring to FIG. 2.

The upper limit threshold value of the channel load factor of a wireless band is set to A, and the lower limit threshold value of the channel load factor is set to D.

At the time when the channel load factor is equal to or higher than line A (upper limit threshold value), control unit 330 starts the congestion control. When the channel load factor is lower than upper limit threshold value A, control unit 330 performs, rather than stops congestion control to maintain the channel load factor between setting values B and C that are lower than upper limit threshold value A. Thus, a sudden decrease of the channel load factor is prevented during the congestion control.

At the time when the channel load factor is equal to or lower than line D (lower limit threshold value), control unit 330 cancels the congestion control. When the channel load factor is higher than lower limit threshold value D, control unit 330 performs congestion control to maintain the channel load factor between setting values C and B that are higher than lower limit threshold value D. Thus, a sudden increase of the channel load factor is prevented even when the congestion control is canceled.

Only one threshold value is set. Then, the congestion control is started above the line (threshold value), and the congestion control is canceled below the line. In this case, the state of the congestion control is not stable, creating a possibility that the channel load factor will repeatedly approach and deviate from the threshold value. In the exemplary embodiment, a plurality of lines (threshold values) is prepared for the channel load factor: line A (upper limit threshold value) for starting the congestion control, line B (setting value) for maintaining the state, line D (lower limit threshold value) for cancelling the congestion control, and line C (setting value) for maintaining the state. Then, control is performed to prevent the state of the congestion control from being frequently changed.

Figure 2:
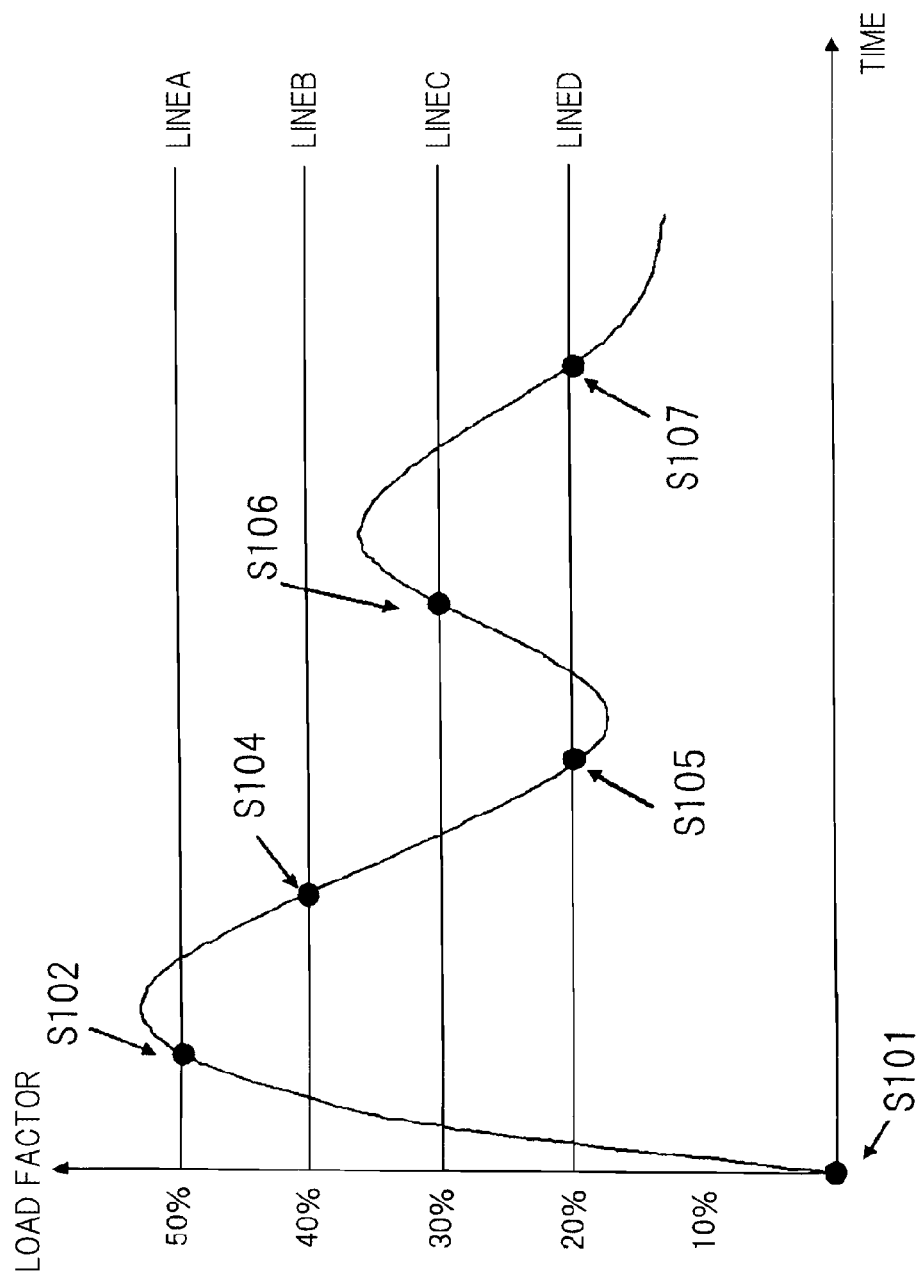
FIG. 2 A graph illustrating a relationship between congestion control and cancellation and a channel load factor.

In FIG. 2, line A is set to a channel load factor 50%, line B is set to a channel load factor 40%, line C is set to a channel load factor 30%, and line D is set to a channel load factor 20%. The channel load factors of the lines are set in the relationships of line A>line B and line C>line D. Any one of lines B and C may be higher, or they may be equal.

In S101, the channel load factor is lower than line D. Accordingly, no congestion control is performed. When the channel load factor increases and when wireless unit 310 detects that the channel load factor has exceeded line A in S102, control unit 330 starts congestion control. Control unit 330 calculates an average value among the values of transmission power contributing to congestion, which have been received by processing unit 320, and checks whether or not the value of the transmission power of vehicle-mounted device (own device) 300 is larger than the average value.

When the transmission power of vehicle-mounted device 300 is larger than the average value of the transmission power of the other vehicle-mounted devices, which has been received by processing unit 320, control unit 330 sets the value of the transmission power of vehicle-mounted device 300 to be slightly smaller than the average value. When the value of the transmission power of vehicle-mounted device 300 is smaller than the average value among the values of the transmission power of the other vehicle-mounted devices, which have been received by processing unit 320, control unit 330 does not change the value of the transmission power of vehicle-mounted device 300. By changing the value (value of transmission power) of each car contributing to congestion, the channel load factor is decreased.

When the channel load factor still exceeds line A or B even after the value of the transmission power of vehicle-mounted device 300 has been set to be smaller than the average value among the values of the transmission power of the other vehicle-mounted devices, control unit 330 calculates an average value among the values of specific parameters (e.g., reception sensitivity, transmission communication rate, or transmission interval) contributing to congestion, which have been received by processing unit 320, and checks whether or not the value of the specific parameter of vehicle-mounted device (own device) 300 is smaller than the average value.

When the value of the specific parameter of vehicle-mounted device 300 is smaller than the average value among the values of the specific parameters of the other vehicle-mounted devices, which have been received by processing unit 320, control unit 330 sets the value of the specific parameter of vehicle-mounted device 300 to be slightly larger than the average value.

When the aforementioned control is performed for each fixed time and, in S104, and when wireless unit 310 detects that the channel load factor is lower than line B, each car (vehicle-mounted device 300) maintains a current parameter setting value.

Then, when the degree of congestion continues to decrease due to the reduced number of cars and when, in S105, the channel load factor decreases below line D, control unit 330 cancels the congestion control.

Control unit 330 sets the value of, among the parameters of vehicle-mounted device (own device) 300, a predetermined parameter (transmission power) contributing to congestion, to be slightly larger than an average value among the values of the predetermined parameters (transmission power) of the other vehicle-mounted devices. Each car changes the value of the predetermined parameter (transmission power). Accordingly, the channel load factor increases.

When the channel load factor is still below line C even after the value of the transmission power of vehicle-mounted device 300 has been set to be larger than the average value among the values of the transmission power of the other vehicle-mounted devices, control unit 330 sets the value of the specific parameter (e.g., reception sensitivity, transmission communication rate, or transmission interval) of vehicle-mounted device 300 to be slightly smaller than the average value among the values of the specific parameters of the other vehicle-mounted devices.

When the aforementioned control is performed for each fixed time and when, in S106, wireless unit 310 detects that the channel load factor exceeds line C, each car maintains a current parameter setting value.

Then, the degree of congestion increases when the number of cars increases. However, the degree of congestion decreases when the number of cars decreases in this state (S106 to S107).

In S107, when the channel load factor decreases below line D again, congestion control is canceled, and each car sets the value of transmission power so that the value (transmission power) contributing to congestion can be slightly larger than the average value.

The parameters contributing to congestion are a transmission power value, reception sensitivity, a transmission communication rate and a transmission interval. Control unit 330 preferentially changes the setting values of the parameters in the order of (1) transmission power; (2) reception sensitivity; (3) transmission communication rate; and (4) transmission interval.

Vehicle-mounted device 300 sets the value of the transmission power of its own device, which is not equal to the average value of the transmission power of the other vehicle-mounted devices but to the value deviated from the average value, in consideration of a state where the initial values of the transmission power of the other vehicle-mounted devices are equal to one another and where the values of the transmission power of the other vehicle-mounted devices have not been changed from the initial values. In this state, when a congestion state is generated and when the value of the transmission power of vehicle-mounted device 300 is set to be equal to the average value, the values of the transmission power of vehicle-mounted device 300 and the other vehicle-mounted devices are all equal. Accordingly, none of the vehicle-mounted devices reduces the value of the transmission power of its own device any further. Even when the congestion control is executed to cancel congestion, if each parameter has accidentally been set to be equal to the average value, the congestion cannot be controlled. Thus, control unit 330 sets the value of the transmission power of vehicle-mounted device 300 to be not equal to the average value of the transmission power of the other vehicle-mounted devices but to the value that deviates from the average value.

Vehicle-mounted device 300 sets, concerning each of the parameters (specific parameters) including reception sensitivity, the transmission communication rate and the transmission interval, the value of the parameter of its own device to be not equal to the average value among the values of the specific parameters of the other vehicle-mounted devices but to the value that deviates from the average value among the values of the specific parameters of the other vehicle-mounted devices in consideration of a similar state.

In the case of performing congestion control, for example, when the value of the transmission power of vehicle-mounted device 300 is larger than the average value among the values of the transmission power indicated by the parameter information, control unit 330 sets the value of the transmission power of vehicle-mounted device 300 to be smaller by a predetermined value than the average value. Specifically, when the value of the transmission power of wireless transmission unit 314 is larger than the average value among the values of the transmission power indicated by the parameter information, control unit 330 supplies transmission power information indicating a value that is slightly smaller than the average value to wireless transmission unit 314. Wireless transmission unit 314, which has received the transmission power information from control unit 330, sets transmission power to be equal to the value indicated by the transmission power information.

In the case of performing congestion control, for example, when the value of the reception sensitivity of vehicle-mounted device 300 is smaller than the average value among the values of the reception sensitivities indicated by the parameter information, control unit 330 sets the value of the reception sensitivity of vehicle-mounted device 300 larger by a predetermined value than the average value. Specifically, when the value of the reception sensitivity of wireless reception unit 313 is smaller than the average value among the values of reception sensitivities indicated by the parameter information, control unit 330 supplies reception sensitivity information indicating a value slightly larger than the average value to wireless reception unit 313. Wireless reception unit 313, which has received the reception sensitivity information from control unit 330, sets reception sensitivity equal to the value indicated by the reception sensitivity information.

In the case of performing congestion control, for example, when the value of the transmission communication rate of vehicle-mounted device 300 is smaller than the average value among the values of the transmission communication rates indicated by the parameter information, control unit 330 sets the value of the transmission communication rate of vehicle-mounted device 300 to be larger by a predetermined value than the average value.

In the case of performing the congestion control, for example, when the value of the transmission interval of vehicle-mounted device 300 is smaller than the average value among the values of the transmission intervals indicated by the parameter information, control unit 330 sets the value of the transmission interval of vehicle-mounted device 300 to be larger by a predetermined value than the average value.

In the case of performing congestion control, even when the value of the transmission power of vehicle-mounted device 300 is equal to the average value among the values of the transmission power indicated by the parameter information, control unit 330 may set the value of the transmission power of vehicle-mounted device 300 to be smaller than the average value. Even in a state where the initial values of the transmission power of vehicle-mounted device 300 and the other vehicle-mounted devices are equal to one another and the values of the transmission power have not been changed from the initial values, when the channel load factor exceeds the determination threshold value, one of the vehicle-mounted devices can reduce the transmission power of its own device. In the case of performing congestion control, concerning each of the parameters of the reception sensitivity, the transmission communication rate and the transmission interval, even when the value of the parameter of vehicle-mounted device 300 is equal to the average value among the values of the parameters indicated by the parameter information, control unit 330 may set the value of the parameter of vehicle-mounted device 300 to be larger than the average value.

After one of the channel load factor measured by wireless reception unit 313 and the average value of the channel load factors indicated by each congestion information has exceeded the determination threshold value (line A) and the value of the transmission power of vehicle-mounted device 300 has been reduced, control unit 330 checks whether neither the channel load factors measured by wireless reception unit 313 nor the average value of the channel load factors indicated by each congestion information exceeds the cancellation threshold value (line B). The cancellation threshold values (line B and line C) are values for canceling the congestion control, which are set between the determination threshold values (line A and line D). In the embodiment, the range where line A is an upper limit and line D is a lower limit is an example of a predetermined range. The range where line B is an upper limit and line C is a lower limit is an example of a specific range.

After the value of the transmission power of vehicle-mounted device 300 has been reduced, when none of the congestion levels measured by wireless reception unit 313 nor the average value of the congestion level indicated by each congestion information exceeds the cancellation threshold value (line B) or below line D, control unit 330 maintains the current value of the transmission power of vehicle-mounted device 300, and does not perform any congestion control.

After the value of the transmission power of vehicle-mounted device 300 has been reduced, when none of the congestion levels measured by wireless reception unit 313 nor the average value of the congestion level indicated by each congestion information is over the cancellation threshold value (line C), control unit 330 may change (increase) the transmission power of vehicle-mounted device 300 in stages so that both can be within the range between cancellation threshold value line B and cancellation threshold value line C.

After the value of the reception sensitivity of vehicle-mounted device 300 has been increased, when none of the channel load factors measured by wireless reception unit 313 nor the average value of the channel load factors indicated by each congestion information exceeds the cancellation threshold value (line C), control unit 330 may reduce the value of the reception sensitivity of vehicle-mounted device 300. For example, control unit 330 may reduce the value of the reception sensitivity of vehicle-mounted device 300 in stages to the reference value of the reception sensitivity.

After the value of the transmission communication rate of vehicle-mounted device 300 has been increased, when none of the channel load factors measured by wireless reception unit 313 nor the average value of the channel load factors indicated by each congestion information exceeds the cancellation threshold value (line C), control unit 330 may reduce the value of the transmission communication rate of vehicle-mounted device 300. For example, control unit 330 may reduce the value of the transmission communication rate of vehicle-mounted device 300 in stages to the reference value of the transmission communication rate.

After the value of the transmission interval of vehicle-mounted device 300 has been increased, when none of the channel load factors measured by wireless reception unit 313 nor the average value of the channel load factors indicated by each congestion information exceeds the cancellation threshold value (line C), control unit 330 may reduce the value of the transmission interval of vehicle-mounted device 300. For example, control unit 330 may reduce the value of the transmission interval of vehicle-mounted device 300 in stages to the reference value of the transmission interval.

In the case of returning the value of the reception sensitivity, the transmission communication rate, or the transmission interval of vehicle-mounted device 300 to the reference value, when the value is returned to the reference value at once, the state may return to the congestion state immediately after the change. Thus, control unit 330 may reduce the value of the reception sensitivity, the transmission communication rate, or the transmission interval of vehicle-mounted device 300 in stages until the channel load factor reaches the cancellation threshold value (line B).

FIGS. 3 and 4 illustrate the operation of congestion control performed by vehicle-mounted device 300.

FIGS. 3 and 4 illustrate parameters (values contributing to congestion) used for the congestion control, namely, a channel load factor, transmission power, reception sensitivity, a transmission communication rate and a transmission interval. The transmission power, the reception sensitivity, the transmission communication rate and the transmission interval are communication parameters defined in ETSI (the European Telecommunications Standards Institute) TS (Technical Specification) 102 687.

In FIGS. 3 and 4, vehicle-mounted device 300 mounted on its own vehicle periodically receives, from each of the other vehicle-mounted devices mounted on the other vehicles, the congestion information of the other vehicle-mounted devices and the parameter information of the other vehicle-mounted devices. FIGS. 3 and 4 illustrate the parameter values of its own vehicle, the parameter values of the other vehicles, and the average value among the parameter values of the other vehicles.

Nos. 1 to 10 indicates vehicles: No. 1 is its own vehicle, and Nos. 2 to 9 are the other vehicles. At first, all the vehicles are in initial states. In S201, when ten vehicles are present in the same area, the channel load factor exceeds 50%. This means that the channel load factor has exceeded the point of S102 (refer to FIG. 2). In the vehicle-mounted devices Nos. 1 to 10, the value of transmission power is first set to be equal to or smaller than the average value. As a result, the range reached by a radio wave is narrowed, and vehicle No. 10 is not seen (not communicable) from vehicle-mounted device 300 of vehicle No. 1, and thus the channel load factor decreases.

After the passage of a fixed amount of time, in S202, since the channel load factor still exceeds 40%, each of the vehicle-mounted devices Nos. 1 to 9 sets reception sensitivity to be equal to or higher than the average value. Sensitivity decreases as the value of reception sensitivity increases, and the communication distance is shorter. As a result, the range reached by a radio wave is narrowed, and vehicle No. 9 is not seen (not communicable) from vehicle-mounted device 300 of vehicle No. 1, and thus the channel load factor decreases.

After the passage of a fixed amount of time, in S203, since the channel load factor is lower than 40%, the channel load factor has exceeded the point of S104 (refer to FIG. 2). Thus, each of vehicle-mounted devices Nos. 1 to 8 maintains its setting value until next time when the channel load factor exceeds 50% or decreases below 20%.

After the passage of a fixed amount of time, in S204, vehicles Nos. 6 to 8 are outside the range reached by the radio wave from vehicle No. 1 and, thus, in a state where the channel load factor decreases, the channel load factor decreases below 20%. This means that the channel load factor exceeds the point of S105 (refer to FIG. 2). Accordingly, each of vehicles Nos. 1 to 5 changes the values in the order reverse to that of changing the values during the congestion control. Each of vehicles Nos. 1 to 5 first reduces the value of reception sensitivity.

After the passage of a fixed amount of time, in S205, since the reception sensitivity has been improved, vehicles Nos. 11 and 12 can be seen (communicable) from vehicle-mounted device 300 of vehicle No. 1. Thus, the channel load factor increases. The channel load factor has exceeded 30%. This means that the channel load factor has exceeded the point of S106 (refer to FIG. 2). Thus, each of vehicle-mounted devices Nos. 1 to 5, 11, and 12 maintains its setting value until next time when the channel load factor exceeds 50% or decreases below 20%.

After the passage of a fixed amount of time, in S206, vehicles Nos. 5, 11, and 12 are outside the range reached by the radio wave from vehicle No. 1, and thus the channel load factor decreases. In this state, the channel load factor decreases below 20%. This means that the channel load factor exceeds the point of S107 (refer to FIG. 2). Accordingly, each of vehicles Nos. 1 to 4 changes the values in the order reverse to that of changing the values during the congestion control. In this case, each of vehicles Nos. 1 to 4 increases the value of the transmission power because the reception sensitivity has been returned to the original level.

After the passage of a fixed amount of time, in S207, even while the range reached by the radio wave has been widened by the increased transmission power, no new vehicle is seen. In the absent state of vehicle No. 4, the channel load still continues to decrease. Each value will not be changed further because the setting value of each vehicle has been returned to the original setting value.

Reasons for prioritizing the values contributing to congestion are as follows.

The utilization rate of the wireless band can be halved by doubling the transmission interval. However, depending on service contents, the transmission interval may not be extended. Accordingly, by doubling the transmission communication rate in which the transmission interval is lowest in priority, the utilization rate of the wireless band can be halved. However, a packet error rate is higher as the communication rate is higher. Thus, depending on service contents, the transmission communication rate may not be changed. Accordingly, the priority of the transmission communication rate is low, but is higher than that of the transmission interval.

When the transmission power is reduced, the area reached by a packet transmitted from its own vehicle is narrowed. When the reception sensitivity is reduced (value is increased), the area reached by packets transmitted from the other vehicles is narrowed. Because of the presence of many cars in the area, in view of possible congestion, narrowing the area itself may contribute greatest to congestion control. The priority of these (transmission power and reception sensitivity) is high.

FIGS. 3 and 4 are tables illustrating the simplified examples of the changes of the values contributing to congestion; the tables do not illustrate the correct relationship between the number of cars and the channel load factor. Fixed time described below is a value set based on an initial value, indicating a time interval for checking the channel load factor every several seconds.

Figure 5:
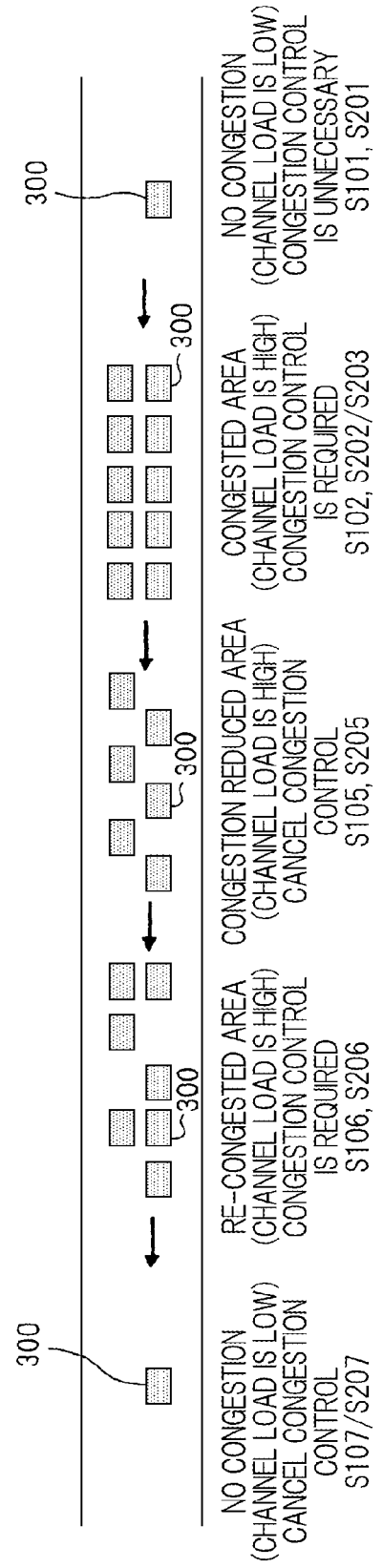
FIG. 5 A diagram illustrating a communication system including a plurality of vehicle-mounted vehicles 300.

FIG. 5 is a diagram illustrating a state where congestion control by vehicle-mounted vehicle 300 is necessary.

FIG. 5 illustrates communication system 100 including a plurality of vehicle-mounted vehicles 300 and a congested area in which congestion control is necessary.

As illustrated in FIG. 5, the entry of the car on which vehicle-mounted device 300 has been mounted into the congested area creates a possibility that inter-vehicle communication will be disabled due to the congested wireless band used for inter-vehicle communication. The vehicle-mounted device of the car that has entered congested area (hereinafter, referred to as "vehicle-mounted device in congested area") 300 receives congestion information and parameter information from each of the other vehicle-mounted devices in the congested area, and determines the channel load factors measured by vehicle-mounted device 300 or the average value of the parameter values indicated by the congestion information exceeds determination threshold value A.

When it is determined that the channel load factor measured by vehicle-mounted device 300 or the average value of the parameter values indicated by the congestion information exceeds determination threshold value A, vehicle-mounted device 300 in the congested area compares, for each of the parameters, namely, the transmission power, the reception sensitivity, the transmission communication rate and the transmission interval, the value of the parameter of its own device with the average value among the parameter values of the other vehicle-mounted vehicles.

When the value of the transmission power of its own device is larger than the average value among the values of the transmission power of the other vehicle-mounted vehicles, vehicle-mounted device 300 in the congested area sets the value of the transmission power of vehicle-mounted device 300 to be smaller than the average value among the values of the transmission power of the other vehicle-mounted vehicles. The smaller value of the transmission power leads to narrowing of a transmission region reached by the transmitted radio signal. Thus, the number of communicable cars is reduced, and congestion is reduced.

When the value of the reception sensitivity of its own device is smaller than the average value among the values of the reception sensitivity of the other vehicle-mounted vehicles, vehicle-mounted device 300 in the congested area sets the value of the reception sensitivity of vehicle-mounted device 300 to be larger than the average value among the values of the reception sensitivity of the other vehicle-mounted vehicles. The larger value of the reception sensitivity leads to narrowing of a reception region in which the radio signal can be received. Thus, the number of communicable cars is reduced, and congestion is reduced.

When the value of the transmission communication rate of its own device is smaller than the average value among the values of the transmission communication rates of the other vehicle-mounted vehicles, vehicle-mounted device 300 in the congested area sets the value of the transmission communication rate of vehicle-mounted device 300 to be larger than the average value among the values of the transmission communication rates of the other vehicle-mounted vehicles. The larger value of the transmission communication rate leads to a reduction of the transmission power of the radio signal per bit. Thus, the number of communicable cars is reduced, and congestion is reduced.

When the value of the transmission interval of its own device is smaller than the average value among the values of the transmission intervals of the other vehicle-mounted vehicles, vehicle-mounted device 300 in the congested area sets the value of the transmission interval of vehicle-mounted device 300 to be larger than the average value among the values of the transmission intervals of the other vehicle-mounted vehicles. The larger value of the transmission interval leads to shortening of the occupancy time of a packet per unit time. Thus, congestion is reduced.

Vehicle-mounted device 300 in the congested area exits from the congested area after the value of the transmission power of its own device has been reduced, or after the value of the reception sensitivity, the transmission communication rate, or the transmission interval of its own device has been increased. Then, vehicle-mounted device 300 that is outside the congested area receives congestion information and parameter information from each of the other vehicle-mounted devices that are outside the congested area, and determines whether none of the channel load factors measured by its own device nor the average value of the parameter values indicated by the congestion information exceeds the cancellation threshold value.

When it is determined that the channel load factor measured by vehicle-mounted device 300 or the average value of the channel load factors indicated by the congestion information is lower than determination threshold value D, vehicle-mounted device 300 that is outside the congested area compares, for each of the parameters, namely, the transmission power, the reception sensitivity, the transmission communication rate and the transmission interval, the value of the parameter of its own device with the average value among the parameter values of the other vehicle-mounted vehicles. When the value of the transmission power of its own device is smaller than the average value among the values of the transmission power of the other vehicle-mounted vehicles, vehicle-mounted device 300 sets the value of the transmission power of vehicle-mounted device 300 to be larger than the average value among the values of the transmission power of the other vehicle-mounted vehicles.

Thus, communication system 100 including the predetermined vehicle-mounted device mounted on each of the plurality of vehicles and the vehicle-mounted device for performing communication with the predetermined vehicle-mounted device is configured as follows. Each of the predetermined vehicle-mounted devices transmits the value of a predetermined parameter contribution of which congestion increases as the value of the parameter increases among the parameters relating to the communication of the predetermined vehicle-mounted device. The vehicle-mounted device includes the wireless unit that detects the radio signal to measure a congestion level, the processing unit that receives, from each of the predetermined vehicle-mounted devices, the value of the predetermined parameter of the predetermined vehicle-mounted device, and the control unit that sets, when the congestion level measured by the wireless unit exceeds the predetermined threshold value, the value of the predetermined parameter of its own device to be small when the value of the predetermined parameter of its own device is larger than the average value among the values of the predetermined parameters received by the processing unit, and sets, when the congestion level is below the predetermined threshold value, the value of the predetermined parameter of its own device to be large when the value of the predetermined parameter of its own device is smaller than the average value among the values of the predetermined parameters received by the processing unit.

Figure 6:
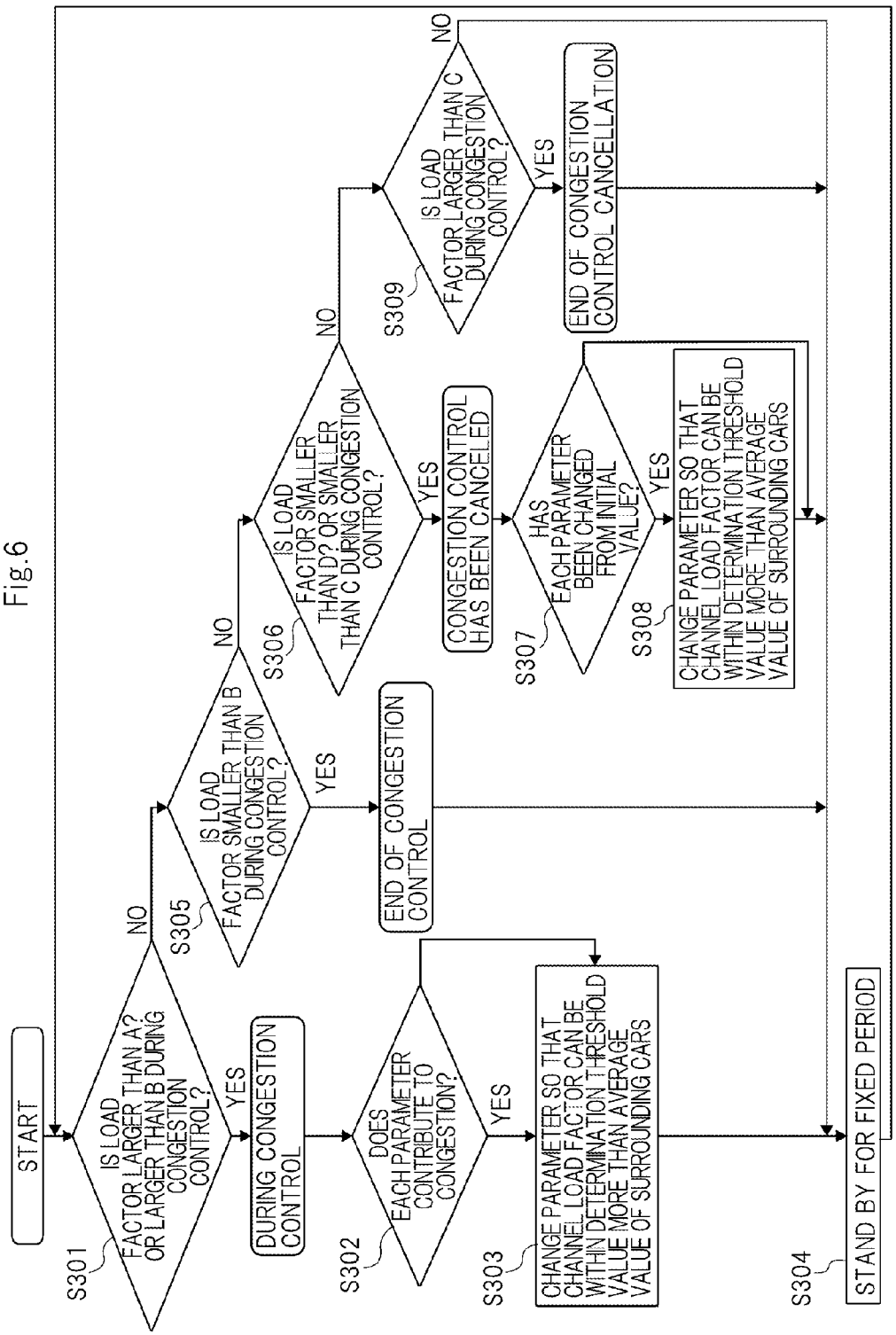
FIG. 6 A flowchart illustrating the processing procedure example of the congestion control method of vehicle-mounted vehicle 300.

FIG. 6 is a flowchart illustrating the processing procedure example (other example) of the congestion control method of vehicle-mounted vehicle 300.

First, wireless unit 310 detects a radio signal to measure a channel load factor, and processing unit 320 receives the channel load factor and parameter information for each of the other vehicle-mounted devices. Then, control unit 330 determines whether the channel load factors measured by vehicle-mounted device 300 or an average value of the channel load factors of the other vehicle-mounted devices exceeds line A (step S301).

When it is determined that the channel load factor measured by wireless unit 310 or the average value of the channel load factors of the other vehicle-mounted devices exceeds line A, control unit 330 checks whether each of the value of the transmission power, the value of the reception sensitivity, the value of the transmission communication rate and the value of the transmission interval of vehicle-mounted vehicle 300 contributes significantly to congestion (step S302).

Control unit 330 checks the deviation amount of the value of the transmission power of vehicle-mounted device 300 from the average value among the values of the transmission power of the other vehicle-mounted devices. Similarly, for each of the parameters including the reception sensitivity, the transmission communication rate and the transmission interval, control unit 330 checks the deviation amount of the value of the parameter of vehicle-mounted device 300 from the average value among the values of the parameters of the other vehicle-mounted devices.

When the parameters concerning the communication of vehicle-mounted device 300 includes a parameter contributing, in particular, to congestion, control unit 330 changes the value of the parameter so that the channel load factor can be within the determination threshold value (step S303).

In a case where the channel load factor exceeds the upper limit determination threshold value and congestion control is necessary, control unit 330 sets the value of the transmission power of vehicle-mounted device 300 to be smaller than the average value when the value of the transmission power of vehicle-mounted device 300 is larger than the average value among the values of the transmission power of the other vehicle-mounted devices. Similarly, for each of the parameters including the reception sensitivity, the transmission communication rate and the transmission interval, control unit 330 sets the value of the parameter of vehicle-mounted device 300 to be larger than the average value when the value of the parameter of vehicle-mounted device 300 is smaller than the average value among the values of the parameters of the other vehicle-mounted devices.

Control unit 330 changes one value rather than changes all the values to approach the average values at once, and stands by for a fixed period (S304). When the values still deviate from the average values, control unit 330 returns to the first step. When it is determined in step S301 that the channel load factor exceeds line B, control unit 330 performs the same congestion control processing.

When the channel load factor decreases below line B during the congestion control (S305), control unit 330 ends the congestion control. At this time, the value of each parameter may be returned to an initial value.

Conversely, wireless unit 310 detects a radio signal to measure a channel load factor, and processing unit 320 receives the channel load factor and parameter information for each of the other vehicle-mounted devices. Then, control unit 330 determines whether the channel load factors measured by vehicle-mounted device 300 or an average value of the channel load factors of the other vehicle-mounted devices is below line D (step S307).

When it is determined that the channel load factor measured by wireless unit 310 or the average value of the channel load factors of the other vehicle-mounted devices is below line D, control unit 330 checks whether each of the value of the transmission power, the value of the reception sensitivity, the value of the transmission communication rate and the value of the transmission interval of vehicle-mounted vehicle 300 has been changed from an initial value (step S307).

Control unit 330 checks the deviation amount of the value of the transmission power of vehicle-mounted device 300 from the average value among the values of the transmission power of the other vehicle-mounted devices. Similarly, for each of the parameters including the reception sensitivity, the transmission communication rate and the transmission interval, control unit 330 checks the deviation amount of the value of the parameter of vehicle-mounted device 300 from the average value among the values of the parameters of the other vehicle-mounted devices.

When the parameters concerning the communication of vehicle-mounted device 300 includes a parameter that has changed from the initial value, control unit 330 changes the value of the parameter so that the channel load factor can be within the determination threshold value (step S308).

In a case where the channel load factor is below the lower limit determination threshold value and congestion control is unnecessary, control unit 330 sets the value of the transmission power of vehicle-mounted device 300 to be larger than the average value when the value of the transmission power of vehicle-mounted device 300 is smaller than the average value among the values of the transmission power of the other vehicle-mounted devices. Similarly, for each of the parameters including the reception sensitivity, the transmission communication rate and the transmission interval, control unit 330 sets the value of the parameter of vehicle-mounted device 300 to be smaller than the average value when the value of the parameter of vehicle-mounted device 300 is larger than the average value among the values of the parameters of the other vehicle-mounted devices.

Control unit 330 changes one value rather than all the values to approach the average values at once, and stands by for a fixed period (S304). When the values still deviate from the average values, control unit 330 returns to the first step.

When it is determined in step S306 that the channel load factor is below line C, control unit 330 performs the same congestion control cancellation processing.

When the channel load factor exceeds line C during the congestion control cancellation (S309), control unit 330 ends the congestion control. At this time, the value of each parameter may be returned to the initial value.

In vehicle-mounted device 300, the series of processing steps S201 to S206 is repeated.

The embodiment has been described by way of example where among the parameters concerning the communication of vehicle-mounted device 300, the transmission power, the reception sensitivity, the transmission communication rate and the transmission interval are used. However, at least one parameter from among the transmission power, the reception sensitivity, the transmission communication rate and the transmission interval may be used.

In the foregoing embodiment, the illustrated configuration is only an example. The present invention is not limited to the configuration.

In the vehicle-mounted device according to the embodiment, the control means sets, when the congestion level measured by the measurement means exceeds the predetermined range, the value of the predetermined parameter of its own device so that the congestion level can decrease.

In the vehicle-mounted device according to the embodiment, the control means sets, when the congestion level measured by the measurement means is lower than the predetermined range, the value of the predetermined parameter of its own device so that the congestion level can increase.

In the vehicle-mounted device according to the embodiment, the control means calculates the average value among the values of the predetermined parameters received by the reception means, and sets, in a state where the value of the congestion level measured by the measurement means exceeds the predetermined range, the value of the predetermined parameter of its own device to be smaller than the average value when the value of the predetermined parameter of its own device is larger than the average value.

In the vehicle-mounted device according to the embodiment, the control means calculates the average value among the values of the predetermined parameters received by the reception means, and sets, in a state where the value of the congestion level measured by the measurement means is smaller than the predetermined range, the value of the predetermined parameter of its own device to be larger than the average value when the value of the predetermined parameter of its own device is smaller than the average value.

In the vehicle-mounted device according to the embodiment, the reception means receives, from each of the predetermined vehicle-mounted devices, congestion levels measured by the predetermined vehicle-mounted devices, and the control means sets, after the reception means has received the value of the predetermined parameter and the congestion levels, when the congestion level measured by the measurement means or an average value among the congestion levels received by the reception means is outside the predetermined range, the value of the predetermined parameter of its own device so that the congestion level can be within the predetermined range in consideration of the magnitude relationship between the congestion level measured by the measurement means and the value within the predetermined range and the magnitude relationship between the value of the predetermined parameter received by the reception means and the value of the predetermined parameter of its own device.

In the vehicle-mounted device according to the embodiment, the control means may maintain, after the value of the predetermined parameter of its own device has been changed so that the congestion level can be within the predetermined range, the value of the predetermined parameter of its own device when both the congestion level measured by the measurement means and the average value among the congestion levels received by the reception means have reached a specific range that is smaller than the range, and approach, when the specific range has not been reached, the value of the predetermined parameter of its own device in stages to the calculated average value of the predetermined parameter values.

In the vehicle-mounted device according to the embodiment, the control means sets, when the congestion level measured by the measurement means exceeds the predetermined range, the value of the specific parameter of its own device so that the congestion level can decrease.

In the vehicle-mounted device according to the embodiment, the control means sets, when the congestion level measured by the measurement means is lower than the predetermined range, the value of the specific parameter of its own device so that the congestion level can increase.

In the vehicle-mounted device according to the embodiment, the control means calculates the average value among the values of the specific parameters received by the reception means, and sets, in a state where the value of the congestion level measured by the measurement means exceeds the predetermined range, the value of the specific parameter of its own device to be larger than the average value when the value of the specific parameter of its own device is smaller than the average value.

In the vehicle-mounted device according to the embodiment, the control means calculates the average value among the values of the specific parameters received by the reception means, and sets, in a state where the value of the congestion level measured by the measurement means is smaller than the predetermined range, the value of the specific parameter of its own device to be smaller than the average value when the value of the specific parameter of its own device is larger than the average value.

In the vehicle-mounted device according to the embodiment, the reception means receives, from each of the predetermined vehicle-mounted devices, congestion levels measured by the predetermined vehicle-mounted devices, and the control means sets, after the reception means has received the value of the specific parameter and the congestion levels, when the congestion level measured by the measurement means or the average value among the congestion levels received by the reception means is outside the predetermined range, the value of the specific parameter of its own device so that the congestion level can be within the predetermined range in consideration of the magnitude relationship between the congestion level measured by the measurement means and the value within the predetermined range and the magnitude relationship between the value of the specific parameter received by the reception means and the value of the specific parameter of its own device.

In the vehicle-mounted device according to the embodiment, the control means may maintain, after the value of the specific parameter of its own device has been changed so that the congestion level can be within the predetermined range, the value of the specific parameter of its own device when both the congestion level measured by the measure-
ment means and the average value among the congestion levels received by the reception means have reached a specific range that is smaller than the range, and approach, when the specific range has not been reached, the value of the predetermined parameter of its own device in stages to the calculated average value of the specific parameter values.

In the vehicle-mounted device according to the embodiment, the transmission power is used as the predetermined parameter.

In the vehicle-mounted device according to the embodiment, at least one parameter from among the reception sensitivity, the transmission communication rate and the transmission interval is used as the specific parameter.

In the vehicle-mounted device according to the embodiment, the transmission power is used as the predetermined parameter. The reception sensitivity, the transmission communication rate and the transmission interval are used as the specific parameters. When the values of the predetermined parameter and the specific parameter of its own device are changed so that the congestion level can be within the predetermined range, the control means changes values in an order of the transmission power, the reception sensitivity, the transmission communication rate and the transmission interval.

The embodiment of the present invention has been described. However, the present invention is not limited to the embodiment. Various changes understandable to those skilled in the art can be made to the configuration and the specifics of the present invention without departing from the scope of the invention.

This application claims priority from Japanese Patent Application No. 2012-033836 filed Feb. 20, 2012, which is hereby incorporated by reference herein in its entirety.

REFERENCE NUMERALS

100 Communication system
300 Vehicle-mounted device
310 Wireless unit
311 Antenna
312 Switch
313 Wireless reception unit
314 Wireless transmission unit
320 Processing unit
321 Reception processing unit
322 'Application unit
323 Transmission processing unit
330 Control unit

What is claimed is:

1. A vehicle-mounted device, which communicates with a predetermined vehicle-mounted device mounted on each of a plurality of vehicles by a radio signal, comprising:
 a measurement unit that detects the radio signal to measure a congestion level;
 a reception unit that receives, from each of the predetermined vehicle-mounted devices, a value of a predetermined parameter, in which a degree of contribution to congestion increases as the value of the parameter increases, from among parameters relating to the communication of the predetermined vehicle-mounted device; and
 a control unit that sets, when the congestion level measured by the measurement unit is outside a set predetermined range, the value of the predetermined parameter of its own device so that the congestion level is within the predetermined range in consideration of a magnitude relationship between the congestion level and a value within the predetermined range and a magnitude relationship between the value of the predetermined parameter received by the reception unit and the value of the predetermined parameter of its own device.

2. The vehicle-mounted device according to claim 1, wherein the control unit sets, when the congestion level measured by the measurement unit exceeds the predetermined range, the value of the predetermined parameter of its own device so that the congestion level decreases.

3. The vehicle-mounted device according to claim 1, wherein the control unit sets, when the congestion level measured by the measurement unit is lower than the predetermined range, the value of the predetermined parameter of its own device so that the congestion level increases.

4. The vehicle-mounted device according to claim 2, wherein the control unit calculates an average value among the values of the predetermined parameters received by the reception unit, and sets, in a state where a value of the congestion level measured by the measurement unit exceeds the predetermined range, the value of the predetermined parameter of its own device to be smaller than the average value when the value of the predetermined parameter of the its device is larger than the average value.

5. The vehicle-mounted device according to claim 3, wherein the control unit calculates an average value among the values of the predetermined parameters received by the reception unit, and sets, in a state where a value of the congestion level measured by the measurement unit is smaller than the predetermined range, the value of the predetermined parameter of the its device to be larger than the average value when the value of the predetermined parameter of its own device is smaller than the average value.

6. The vehicle-mounted device according to claim 1, wherein:
the reception unit receives, from each of the predetermined vehicle-mounted devices, congestion levels measured by the predetermined vehicle-mounted devices; and
the control unit sets, after the reception unit has received the value of the predetermined parameter and the congestion levels, when the congestion level measured by the measurement unit or an average value among the congestion levels received by the reception unit is outside the predetermined range, the value of the predetermined parameter of its own device so that the congestion level can be within the predetermined range in consideration of the magnitude relationship between the congestion level measured by the measurement unit and the value within the predetermined range and the magnitude relationship between the value of the predetermined parameter received by the reception unit and the value of the predetermined parameter of its own device.

7. The vehicle-mounted device according to claim 6, wherein the control unit maintains, after the value of the predetermined parameter of its own device has been changed so that the congestion level is within the predetermined range, the value of the predetermined parameter of its own device when both the congestion level measured by the measurement unit and the average value among the congestion levels received by the reception unit have reached a specific range included in the predetermined range, and changes, when the specific range has been not reached, the value of the predetermined parameter of its own device in stages so that both reach the specific range.

8. The vehicle-mounted device according to claim 1, wherein transmission power is used as the predetermined parameter.

9. A vehicle-mounted device, which communicates with a predetermined vehicle-mounted device mounted on each of a plurality of vehicles by a radio signal, comprising:
a measurement unit that detects the radio signal to measure a congestion level;
a reception unit that receives, from each of the predetermined vehicle-mounted devices, a value of a specific parameter, in which a degree of contribution to congestion decreases as the value of the parameter increases, from among parameters relating to the communication of the predetermined vehicle-mounted device; and
a control unit that sets, when the congestion level measured by the measurement unit is outside a set predetermined range, the value of the specific parameter of its own device so that the congestion level is within the predetermined range in consideration of a magnitude relationship between the congestion level and a value within the predetermined range and a magnitude relationship between the value of the specific parameter received by the reception unit and the value of the specific parameter of its own device.

10. The vehicle-mounted device according to claim 9, wherein the control unit sets, when the congestion level measured by the measurement unit exceeds the predetermined range, the value of the specific parameter of its own device so that the congestion level decreases.

11. The vehicle-mounted device according to claim 9, wherein the control unit sets, when the congestion level measured by the measurement unit is lower than the predetermined range, the value of the specific parameter of its own device so that the congestion level increases.

12. The vehicle-mounted device according to claim 10, wherein the control unit calculates an average value among the values of the specific parameters received by the reception unit, and sets, in a state where a value of the congestion level measured by the measurement unit exceeds the predetermined range, the value of the specific parameter of its own device to be larger than the average value when the value of the specific parameter of its own device is smaller than the average value.

13. The vehicle-mounted device according to claim 11, wherein the control unit calculates an average value among the values of the specific parameters received by the reception unit, and sets, in a state where a value of the congestion level measured by the measurement unit is smaller than the predetermined range, the value of the specific parameter of its own device to be smaller than the average value when the value of the specific parameter of its own device is larger than the average value.

14. The vehicle-mounted device according to claim 9, wherein:
the reception unit receives, from each of the predetermined vehicle-mounted devices, congestion levels measured by the predetermined vehicle-mounted devices; and
the control unit sets, after the reception unit has received the value of the specific parameter and the congestion levels, when the congestion level measured by the measurement unit or an average value among the congestion levels received by the reception unit is outside the predetermined range, the value of the specific parameter of its own device so that the congestion level is within the predetermined range in consideration of the magnitude relationship between the congestion level measured by the measurement unit and the value within the predetermined range and the magnitude relationship between the value of the specific parameter received by the reception unit and the value of the specific parameter of its own device.

15. The vehicle-mounted device according to claim 14, wherein the control unit maintains, after the value of the specific parameter of its own device has been changed so that the congestion level is within the predetermined range, the value of the specific parameter of its own device when both the congestion level measured by the measurement unit and the average value among the congestion levels received by the reception unit have reached a specific range included in the predetermined range, and changes, when the specific range has been not reached, the value of the specific parameter of its own device in stages so that both can reach the specific range.

16. The vehicle-mounted device according to claim 9, wherein at least one parameter from among reception sensitivity, a transmission communication rate and a transmission interval is used as the specific parameter.

17. A vehicle-mounted device, which communicates with a predetermined vehicle-mounted device mounted on each of a plurality of vehicles by a radio signal, comprising:
   a measurement unit that detects the radio signal to measure a congestion level;
   a reception unit that receives, from each of the predetermined vehicle-mounted devices, a value of a predetermined parameter, in which a degree of contribution to congestion increases as the value of the parameter increases, and a value of a specific parameter, in which a degree of contribution to congestion decreases as the value of the parameter increases, from among parameters relating to the communication of the predetermined vehicle-mounted device; and
   a control unit that sets, when the congestion level measured by the measurement unit is outside a set predetermined range, the value of the predetermined parameter and/or the value of the specific parameter of its own device so that the congestion level is within the predetermined range in consideration of a magnitude relationship between the congestion level and a value within the predetermined range, a magnitude relationship between the value of the predetermined parameter received by the reception unit and the value of the predetermined parameter of its own device, and a magnitude relationship between the value of the specific parameter received by the reception unit and the value of the specific parameter of its own device.

18. The vehicle-mounted device according to claim 17, wherein:
   transmission power is used as the predetermined parameter;
   the reception sensitivity, the transmission communication rate and the transmission interval are used as the specific parameters; and
   the control unit changes, when the values of the predetermined parameter and the specific parameter of its own device are changed so that the congestion level is within the predetermined range, values in order of the transmission power, reception sensitivity, transmission communication rate and transmission interval.

19. A congestion control method of a vehicle-mounted device, which communicates with a predetermined vehicle-mounted device mounted on each of a plurality of vehicles by a radio signal, comprising:
   detecting the radio signal to measure a congestion level;
   receiving, from each of the predetermined vehicle-mounted devices, a value of a predetermined parameter, in which a degree of contribution to congestion increases as the value of the parameter increases, from among parameters relating to the communication of the predetermined vehicle-mounted device; and
   setting, when the measured congestion level is outside a set predetermined range, the value of the predetermined parameter of its own device so that the congestion level is within the predetermined range in consideration of a magnitude relationship between the congestion level and a value within the predetermined range and a magnitude relationship between the received value of the predetermined parameter and the value of the predetermined parameter of its own device.

20. A congestion control method of a vehicle-mounted device, which communicates with a predetermined vehicle-mounted device mounted on each of a plurality of vehicles by a radio signal, comprising:
   detecting the radio signal to measure a congestion level;
   receiving, from each of the predetermined vehicle-mounted devices, a value of a specific parameter, in which a degree of contribution to congestion increases as the value of the parameter decreases, from among parameters relating to the communication of the predetermined vehicle-mounted device; and
   setting, when the measured congestion level is outside a set predetermined range, the value of the specific parameter of its own device so that the congestion level is within the predetermined range in consideration of a magnitude relationship between the congestion level and a value within the predetermined range and a magnitude relationship between the received value of the specific parameter and the value of the specific parameter of its own device.

21. A congestion control method of a vehicle-mounted device, which communicates with a predetermined vehicle-mounted device mounted on each of a plurality of vehicles by a radio signal, comprising:
   detecting the radio signal to measure a congestion level;
   receiving, from each of the predetermined vehicle-mounted devices, a value of a predetermined parameter, in which a degree of contribution to congestion increases as the value of the parameter increases and a value of a specific parameter, in which a degree of contribution to congestion decreases as the value of the parameter increases, from among parameters relating to the communication of the predetermined vehicle-mounted device; and
   setting, when the measured congestion level is outside a set predetermined range, the value of the predetermined parameter and/or the value of the specific parameter of its own device so that the congestion level is within the predetermined range in consideration of a magnitude relationship between the congestion level and a value within the predetermined range, a magnitude relationship between the received value of the predetermined parameter and the value of the predetermined parameter of its own device, and a magnitude relationship between the received value of the specific parameter and the value of the specific parameter of its own device.

* * * * *